US012783668B2

(12) United States Patent
Taneja et al.

(10) Patent No.: US 12,783,668 B2
(45) Date of Patent: Nov. 3, 2026

(54) PROACTIVE REAL-TIME ANOMALY DETECTION IN CROSS-ENVIRONMENT RPC CALLS THROUGH INTELLIGENT GRAPHRPC METHOD

(71) Applicant: Bank of America Corporation, Charlotte, NC (US)

(72) Inventors: Pushkar Taneja, Hyderabad (IN); Suryanarayana Adivi, Hyderabad (IN); Jemlin Lucas, Coppell, TX (US)

(73) Assignee: Bank of America Corporation, Charlotte, NC (US)

( * ) Notice: Subject to any disclaimer, the term of this patent is extended or adjusted under 35 U.S.C. 154(b) by 334 days.

(21) Appl. No.: 18/673,455

(22) Filed: May 24, 2024

(65) Prior Publication Data

US 2025/0363216 A1 Nov. 27, 2025

(51) Int. Cl.
*G06F 3/00* (2006.01)
*G06F 9/54* (2006.01)
(Continued)

(52) U.S. Cl.
CPC ............ *G06F 21/566* (2013.01); *G06F 9/547* (2013.01); *G06F 21/64* (2013.01); *G06F 2221/034* (2013.01)

(58) Field of Classification Search
CPC .......................................................... G06F 9/48
See application file for complete search history.

(56) References Cited

U.S. PATENT DOCUMENTS 9,450,979 B2 9/2016 Keromytis et al.
10,504,020 B2 12/2019 Trenholm et al.
(Continued)

FOREIGN PATENT DOCUMENTS

CN 111198813 A 5/2020
CN 111932268 B 1/2024
(Continued)

OTHER PUBLICATIONS

Yu Gan, Enabling Practical Cloud Performance Debugging with Unsupervised Learning. (Year: 2022).*

*Primary Examiner* — Lechi Truong
(74) *Attorney, Agent, or Firm* — Banner & Witcoff, Ltd.

(57) ABSTRACT

Systems and methods for proactive real-time anomaly detection in cross-environment RPC (Remote Procedure Call) communications within computing systems. Utilizing an Intelligent GraphRPC Method, this invention integrates advanced graph analysis techniques to enhance fault detection and workflow management. The method features a dual-graph approach, employing both real-time and aggregated dependency graphs, which allows for continuous monitoring and analysis of RPC interactions to detect and prevent unauthorized or misconfigured RPC calls between staging and production environments. An ingestion pipeline further supports the system by aggregating and archiving call graph data, providing beneficial insights into service dependencies and potential security risks. This proactive anomaly detection system is designed to seamlessly integrate into existing monitoring and alerting frameworks, providing a robust solution to safeguard data integrity and operational stability, thereby minimizing losses and reputational damage due to data breaches and system disruptions.

20 Claims, 6 Drawing Sheets

(51) Int. Cl.
*G06F 21/56* (2013.01)
*G06F 21/64* (2013.01)

(56) References Cited

U.S. PATENT DOCUMENTS

| | | | | |
|---|---|---|---|---|
| 10,885,446 | B2 | 1/2021 | Wang et al. | |
| 10,924,410 | B1 * | 2/2021 | Nee | G06Q 10/04 |
| 11,151,020 | B1 * | 10/2021 | Bajoria | G06F 11/3476 |
| 12,155,693 | B1 * | 11/2024 | Crabtree | H04L 9/3239 |
| 2005/0288961 | A1 | 12/2005 | Tabrizi | |
| 2016/0328661 | A1 * | 11/2016 | Reese | G06F 16/29 |
| 2017/0124481 | A1 * | 5/2017 | Crabtree | G06Q 10/0637 |
| 2017/0308800 | A1 * | 10/2017 | Cichon | G06N 20/00 |
| 2017/0371726 | A1 * | 12/2017 | Crabtree | G06F 9/544 |
| 2018/0143826 | A1 * | 5/2018 | Crabtree | G06F 11/3616 |
| 2019/0303579 | A1 * | 10/2019 | Reddy | H04L 9/3239 |
| 2020/0027210 | A1 | 1/2020 | Haemel et al. | |
| 2020/0310937 | A1 * | 10/2020 | Takeda | G06F 11/3006 |
| 2021/0125161 | A1 * | 4/2021 | Crabtree | G06Q 20/102 |
| 2021/0192412 | A1 | 6/2021 | Krishnaswamy | |
| 2022/0318099 | A1 | 10/2022 | Kotwal et al. | |
| 2022/0318204 | A1 | 10/2022 | Sinha et al. | |
| 2022/0321602 | A1 | 10/2022 | Szigeti et al. | |
| 2022/0342866 | A1 | 10/2022 | Kotwal et al. | |
| 2023/0289443 | A1 | 9/2023 | Sinha et al. | |
| 2024/0202102 | A1 * | 6/2024 | Badrinath | G06F 11/1469 |

FOREIGN PATENT DOCUMENTS

| | | | | |
|---|---|---|---|---|
| DE | 102021122880 | A1 | 4/2022 | |
| EP | 3989092 | A1 | 4/2022 | |
| JP | 6416194 | B2 | 10/2018 | |
| JP | 7392245 | B2 | 12/2023 | |
| TW | 201249154 | A | 12/2012 | |
| WO | 2013072232 | A1 | 5/2013 | |
| WO | WO-2017176944 | A1 * | 10/2017 | G06Q 30/0201 |
| WO | 2023016537 | A1 | 2/2023 | |
| WO | WO-2024129438 | A1 * | 6/2024 | G06F 11/3698 |

* cited by examiner

Sample Component Analysis Report for Normal Operation

Components Analysis Report 200: Sample for Metrics Showing Normal Operation

| Configuration | Actual (Total No.) | Traced Successfully |
|---|---|---|
| Protocol | 50 | 50 |
| End Point | 50 | 50 |
| Security | 50 | 50 |
| Time Out | 50 | 50 |
| Error Handling | 50 | 50 |

Sample Component Analysis Report for Abnormal Operation with Errors Detected

Components Analysis Report 300: Sample for Metrics Showing Abnormal Operation

| Configuration | Actual (Total No.) | Traced Successfully |
|---|---|---|
| Protocol | 50 | 49 |
| End Point | 50 | 50 |
| Security | 50 | 40 |
| Time Out | 50 | 37 |
| Error Handling | 50 | 50 |

PROACTIVE REAL-TIME ANOMALY DETECTION IN CROSS-ENVIRONMENT RPC CALLS THROUGH INTELLIGENT GRAPHRPC METHOD

TECHNICAL FIELD

This disclosure pertains to electrical computers and digital processing systems, specifically focusing on multicomputer data transferring. This invention involves advanced methodologies for managing and safeguarding remote procedure call (RPC) communications between multiple computer environments. By employing real-time and proactive anomaly detection techniques, the invention effectively addresses the challenges associated with cross-environment RPC calls, such as those between staging and production servers. The core of the invention lies in its capability to monitor, detect, and prevent unauthorized or unintended data transfers between different computing systems, ensuring that sensitive data and operational processes are protected from disruptions and breaches.

DESCRIPTION OF THE RELATED ART

In the finance industry, the inadvertent crossing of remote procedure calls (RPCs) between production and staging environments poses significant threats to data security and operational integrity. Such errors, though seemingly small, can lead to catastrophic outcomes including unauthorized access to sensitive customer data, interruption of critical financial transactions, and more.

The problem arises from the complex IT environments within financial institutions where multiple development, staging, and production systems interact. In these environments, developers and systems often need to communicate across these platforms to test new features or updates. However, without adequate safeguards, this can inadvertently lead to real operational data being manipulated or accessed during testing phases. The consequences of such mistakes range from data breaches to operational disruptions, leading to financial losses and customer dissatisfaction.

Moreover, the timing of these inadvertent RPC calls can exacerbate their impact. For instance, a misconfigured RPC call during peak trading hours led to a system outage for a financial services company, disrupting trading activities and causing significant market confusion and financial losses. Such incidents highlight the critical need for mechanisms that can detect and prevent cross-environment RPC calls to maintain system reliability and data integrity.

The traditional methods employed to prevent such errors often involve manual checks and controls which are not only time-consuming but also prone to human error. They lack the sophistication needed to handle the dynamic and complex nature of modern financial systems. As financial institutions grow and their data and systems become more interconnected, the likelihood and potential impact of such errors grow exponentially, making it imperative to adopt more advanced, automated solutions.

Furthermore, the issue is not just in detecting these calls when they occur but also in preventing them proactively. Existing systems typically react to breaches after they have occurred, which might be too late to prevent the damage. This reactive approach is insufficient for today's fast-paced financial markets where the speed of operations and transactions is critical, and the expectation for uninterrupted service is high.

The need for a solution that can seamlessly integrate with existing systems to provide real-time monitoring and alerting capabilities is evident. Such a solution would not only detect anomalies but also prevent potential breaches by intercepting unintended cross-environment RPC calls before they cause harm. This proactive detection is beneficial in maintaining the continuous operation and security of financial systems.

Moreover, as digital transformations accelerate within the banking sector, the interdependencies between various services and applications increase. This complex web of interactions makes it even more challenging to monitor and control the flow of information and commands across environments without sophisticated tools that can analyze these interactions in real-time.

To address these challenges, the financial industry has long felt the need for an intelligent, automated system that could provide robust, real-time anomaly detection and workflow management to prevent inadvertent cross-environment RPC calls. Such a system would not only safeguard data and operational integrity but also enhance the overall reliability and efficiency of financial systems. This need, long unmet, underscores the importance of developing solutions that are capable of adapting to the complex, dynamic nature of financial environments while ensuring the highest standards of security and operational continuity.

SUMMARY OF THE INVENTION

The invention provides methods and systems to prevent inadvertent cross-environment Remote Procedure Calls (RPCs), which pose serious risks to data security and operational integrity. Typically, these erroneous RPCs occur when commands intended for staging environments mistakenly target production servers, leading to potential breaches of sensitive data or disruptions in critical banking transactions. Such incidents can result in significant financial losses, regulatory repercussions, and damage to an institution's reputation.

The invention offers a proactive, real-time anomaly detection system specifically tailored for cross-environment RPCs through an innovative method known as GraphRPC. This method enhances the reliability of fault detection and integrates seamlessly with existing monitoring and alerting frameworks, enabling swift issue resolution. By leveraging real-time and aggregated dependency graphs, the system provides continuous oversight of service interactions and microservice architecture, which is beneficial for identifying and addressing vulnerabilities promptly.

The invention utilizes advanced graph analysis techniques. These techniques automate the detection of anomalies in RPC communications, including connection failures, timeout issues, and unauthorized access attempts, among others. By employing both real-time and aggregated graphs, the system can monitor a comprehensive set of metrics and historical data to identify patterns that might indicate potential security threats or operational inefficiencies.

A key feature of the GraphRPC method is its integration into standard monitoring systems, which helps streamline workflow management and enhances operational efficiency. The system includes an ingestion pipeline that aggregates and archives call graph data, providing a rich dataset for analysis. This enables the detection of not just immediate anomalies but also deeper systemic issues that could lead to cross-environment calls.

The architecture of the system consists of several components that work in synergy. The client and server sides are equipped with routines and stubs that facilitate local and remote procedure calls, respectively. Network routines and kernels ensure secure and efficient data transmission across the network. An essential part of the architecture is the Generative AI (GenAI) module, which processes the data through a quantum graph to detect anomalies and manage resources dynamically.

GenAI plays a pivotal role by providing a wrapper model that enriches transactions with additional metadata, aiding in the detection and resolution of anomalies. This metadata might include details such as transaction type, frequency, and last execution times, which are beneficial for understanding the context of each call. The quantum graph component of GenAI analyzes these enriched transactions, using quantum computing, to create a detailed matrix of service interactions, dependencies, and potential vulnerabilities.

Furthermore, the system emphasizes continuous optimization of microservice interactions. It uses AI-driven algorithms to dynamically adjust resource allocations based on real-time data, ensuring that the microservices architecture operates at peak efficiency. This dynamic resource management helps prevent the overload scenarios that typically accompany cross-environment calls in high-demand periods, such as during financial market surges or major sales events in e-commerce.

One of the unique aspects of this invention is its capability for self-healing. The system can automatically detect and correct issues within microservices, minimizing downtime and maintaining consistent performance without human intervention. Additionally, the continuous optimization feature adjusts the system in real-time, responding to changing conditions and demands.

In terms of security, the GraphRPC method enhances the existing defenses by focusing on proactive anomaly detection. By identifying and responding to anomalies before they escalate into more significant issues, the system protects sensitive data and maintains the integrity of financial transactions. The ability to detect protocol violations, unauthorized access attempts, and other security threats in real time is a significant advancement over traditional monitoring methods, which may only provide post-facto analyses.

Lastly, the described invention integrates seamlessly with existing IT infrastructure, making it a versatile and scalable solution for financial institutions looking to enhance their cybersecurity measures and operational resilience. By addressing the specific challenges of cross-environment RPCs through intelligent, real-time analysis and dynamic response capabilities, this technology represents a significant step forward in the management and security of complex IT systems in sensitive sectors.

Considering the foregoing, the following presents a simplified summary of the present disclosure to provide a basic understanding of various aspects of the disclosure. This summary is not limiting with respect to the exemplary aspects of the inventions described herein and is not an extensive overview of the disclosure. It is not intended to identify key or critical elements of or steps in the disclosure or to delineate the scope of the disclosure. Instead, as would be understood by a personal of ordinary skill in the art, the following summary merely presents some concepts of the disclosure in a simplified form as a prelude to the more detailed description provided below. Moreover, sufficient written descriptions of the inventions are disclosed in the specification throughout this application along with exemplary, non-exhaustive, and non-limiting manners and processes of making and using the inventions, in such full, clear, concise, and exact terms to enable skilled artisans to make and use the inventions without undue experimentation and sets forth the best mode contemplated for carrying out the inventions.

In some arrangements, a method for proactive real-time anomaly detection in cross-environment RPC communications between multiple computing environments includes several steps is designed to enhance data security and system integrity. The method begins by continuously monitoring RPC communications in real-time between a staging environment and a production environment, utilizing a network of sensors and detectors. These tools analyze data flow and command execution patterns to detect any unauthorized or unintended data transfers, ensuring that only authorized commands are processed.

To improve fault detection, the method employs a GraphRPC technique that leverages advanced graph analysis techniques, including deploying machine learning algorithms to process and analyze graph data structures representing RPC interactions. This enables the system to quickly identify and address anomalies before they escalate, reducing the risk of data breaches or operational disruptions. Additionally, a real-time graph matrix is generated and dynamically updated to visually represent interactions and dependencies within the RPC communications. This graph matrix is updated on a sub-second basis to reflect real-time data flows and interactions across the network, ensuring swift detection and response to potential issues.

The method further includes aggregating RPC call data into an ingestion pipeline and storing this data for historical analysis using an aggregated graph model. This model provides a comprehensive historical view of service interactions and RPC data flows, enabling in-depth analysis of system performance trends over time and facilitating the identification of patterns and optimization opportunities for long-term operational success.

Integration of the method into existing monitoring and alerting frameworks helps to streamline workflow management and enhance fault detection. This integration involves configuring the anomaly detection system to work synchronously with legacy monitoring tools, providing a unified view of security and performance metrics. The method also utilizes a Generative AI module to enrich RPC transactions with additional metadata, such as transaction type, frequency, and last execution times. Quantum computing algorithms are leveraged to process this metadata to predict and identify potential vulnerabilities based on complex pattern recognition.

Issues within microservices are automatically detected and resolved through self-healing mechanisms, which maintain uninterrupted system operations. This includes automatically rerouting traffic or requests to backup systems when anomalies are detected, and restoring normal operation without human intervention. Machine learning algorithms, both supervised and unsupervised, are employed to predict and detect known and novel anomalous behavior patterns based on historical data comparisons and autonomous exploration of new data patterns. This allows for proactive adjustments to system configurations and parameters in anticipation of similar future events.

Security settings and RPC communication parameters in both the staging and production environments are automatically adjusted based on feedback mechanisms from detected anomalies, including dynamic adjustments to encryption levels and access controls. Additionally, automatic notification mechanisms are integrated within the system's monitoring and alerting frameworks. These mechanisms alert system administrators of detected anomalies, providing detailed reports on the nature, severity, and potential impact of the anomalies, along with actionable recommendations for corrective actions tailored to specific system requirements and administrator preferences. The system also enables manual override by system administrators, allowing them to take immediate, informed actions to address and resolve the detected anomalies in the production environment, thus ensuring continuous operational integrity and security maintenance.

In some arrangements, a system for proactive real-time anomaly detection in cross-environment RPC communications between multiple computing environments includes a network monitoring module configured to continuously monitor RPC communications between a staging environment and a production environment. This module utilizes sensors and detectors to analyze data flow and command execution patterns. Additionally, a GraphRPC module employs advanced graph analysis techniques integrated with machine learning algorithms to process graph data structures representing RPC interactions for intelligent real-time fault detection and anomaly resolution. A real-time graph matrix dynamically updated to visually represent interactions and dependencies within the RPC communications is configured to refresh on a sub-second basis to reflect real-time data. An ingestion pipeline aggregates and archives RPC call data, connecting to an aggregated graph model that compiles comprehensive historical views of service interactions and RPC data flows for in-depth analysis and identification of long-term patterns and optimization opportunities. The system also includes an integration interface to existing monitoring and alerting frameworks to streamline workflow management and enhance fault detection, configured to synchronize with legacy monitoring tools providing a unified security and performance metrics view. A Generative AI module enriches RPC transactions with additional metadata, utilizing quantum computing algorithms for processing said metadata to predict and identify potential vulnerabilities. The system further incorporates a self-healing mechanism within the microservices architecture, programmed to automatically detect and resolve issues, including rerouting traffic or requests to backup systems and restoring operations without human intervention. Machine learning algorithms, including supervised and unsupervised learning techniques, are programmed to analyze historical and real-time data to predict and detect known and novel anomalous behavior patterns. Security and communication parameter adjustment tools are configured to automatically modify settings in both the staging and production environments based on anomaly detection feedback. An alerting subsystem integrated within the monitoring frameworks provides automatic notifications to system administrators about detected anomalies, including detailed anomaly reports with actionable corrective recommendations and manual override capabilities for immediate resolution.

In some arrangements, the network monitoring module of the system includes high-speed data processing units capable of handling high volumes of RPC data and executing complex pattern recognition algorithms to detect anomalies in real-time.

In some arrangements, the GraphRPC module of the system includes a dedicated neural network specifically trained to analyze RPC transaction graphs for identifying discrepancies that could indicate security breaches or operational failures.

In some arrangements, the real-time graph matrix of the system includes user interface elements capable of displaying the graph data in various formats, including heat maps and node-link diagrams, to enhance the visibility of real-time changes and potential threats within the network.

In some arrangements, the ingestion pipeline of the system is equipped with high-capacity storage solutions and is configured to perform data sanitization processes to ensure the integrity and confidentiality of the stored RPC call data.

In some arrangements, the aggregated graph model of the system utilizes predictive analytics software to forecast potential future anomalies based on historical trend analysis, thereby enabling preemptive action to mitigate risks.

In some arrangements, the Generative AI module of the system leverages a library of pre-trained models based on previous anomaly detection scenarios to enhance the accuracy and efficiency of metadata enrichment and vulnerability prediction processes.

In some arrangements, the self-healing mechanism of the system includes an automated testing module that performs integrity checks and functionality tests post-issue resolution to ensure that the system returns to its optimal operational state.

In some arrangements, the alerting subsystem of the system is configured to escalate notifications based on the severity of detected anomalies and can initiate emergency protocols including system lockdowns and detailed forensic analysis to prevent data loss or further intrusion.

In some arrangements, a method for proactive real-time anomaly detection in cross-environment RPC communications between multiple computing environments includes monitoring RPC communications in real-time between a staging environment and a production environment to detect any unauthorized or unintended data transfers. The method also employs a GraphRPC method that utilizes advanced graph analysis techniques for intelligent real-time fault detection to quickly identify and address anomalies before they escalate. Additionally, real-time dependency graphs are generated and dynamically updated to visually represent interactions and dependencies within the RPC communications, facilitating immediate monitoring and alerting. RPC call data is aggregated into an ingestion pipeline and stored for historical analysis. The aggregated data is analyzed using an aggregated graph model to identify patterns indicative of potential security threats or operational inefficiencies over time. The method is integrated into existing monitoring and alerting frameworks to streamline workflow management and enhance fault detection. A Generative AI module is utilized to enrich RPC transactions with additional metadata for enhanced anomaly detection and resolution. Quantum computing is applied to analyze the enriched transactions to identify and address potential vulnerabilities. The method includes automatically detecting and resolving issues within microservices through self-healing mechanisms to maintain uninterrupted system operations.

In some arrangements, the real-time dependency graphs are utilized for continuous assessment of system vulnerabilities. These graphs are dynamically adjusted based on changes in the RPC communications and potential threat levels, providing a proactive approach to problem-solving within the network.

In some arrangements, the continuous assessment further includes the use of machine learning algorithms to predict and detect anomalous behavior patterns in the RPC communications based on a comparison with historical data. This allows for the identification of both known and novel anomalies.

In some arrangements, the machine learning algorithms are configured for supervised learning to refine anomaly detection based on feedback mechanisms from detected anomaly outcomes. This configuration continuously enhances the detection accuracy.

In some arrangements, feedback from detected anomalies is used to automatically adjust security settings and RPC communication parameters in both the staging and production environments. This adjustment helps mitigate risks and prevent future anomalies.

In some arrangements, unsupervised learning algorithms are included to explore new data patterns autonomously. This exploration enhances the system's adaptability to evolving security threats by identifying unforeseen anomalous patterns that have not been previously categorized.

In some arrangements, new anomalous patterns include analyzing deviations from established operational patterns in the RPC communications. These deviations are flagged as potential security breaches or operational disruptions, and automatic preventive measures are initiated to safeguard data integrity.

In some arrangements, automatic notification mechanisms are integrated within the system's monitoring and alerting frameworks. These mechanisms alert system administrators of detected anomalies, providing detailed reports on the nature, severity, and potential impact of the anomalies.

In some arrangements, the notifications include detailed, actionable recommendations for corrective actions based on the type and severity of the detected anomalies. These recommendations are tailored to specific system requirements and administrator preferences.

In some arrangements, the recommendations for corrective actions include options for manual override by system administrators. This override enables administrators to take immediate, informed actions to address and resolve the detected anomalies in the production environment, ensuring that the system maintains high standards of reliability and security.

The following description and the appended claims, with reference to the accompanying drawings, which all form a part of this specification and where like reference numerals designate corresponding parts in the various figures, will make these and other features and characteristics of the current technology, as well as the methods of operation and functions of the related elements of structure and the combination of parts and economies of manufacture, more apparent. As computer-executable instructions (or as computer modules or in other computer constructs) recorded on computer-readable media, one or more of the different procedures or processes described herein may be implemented in whole or in part. Steps and functionality might be carried out on a single machine or dispersed over several devices that are connected to one another. However, it is clearly recognized that the drawings are meant primarily for descriptive and illustrative purposes and are not meant to define the boundaries of the invention. Unless the context makes it obvious otherwise, the single forms of "a," "an," and "the" as they appear in the specification and claims include plural referents.

DETAILED DESCRIPTION

Figure 1:
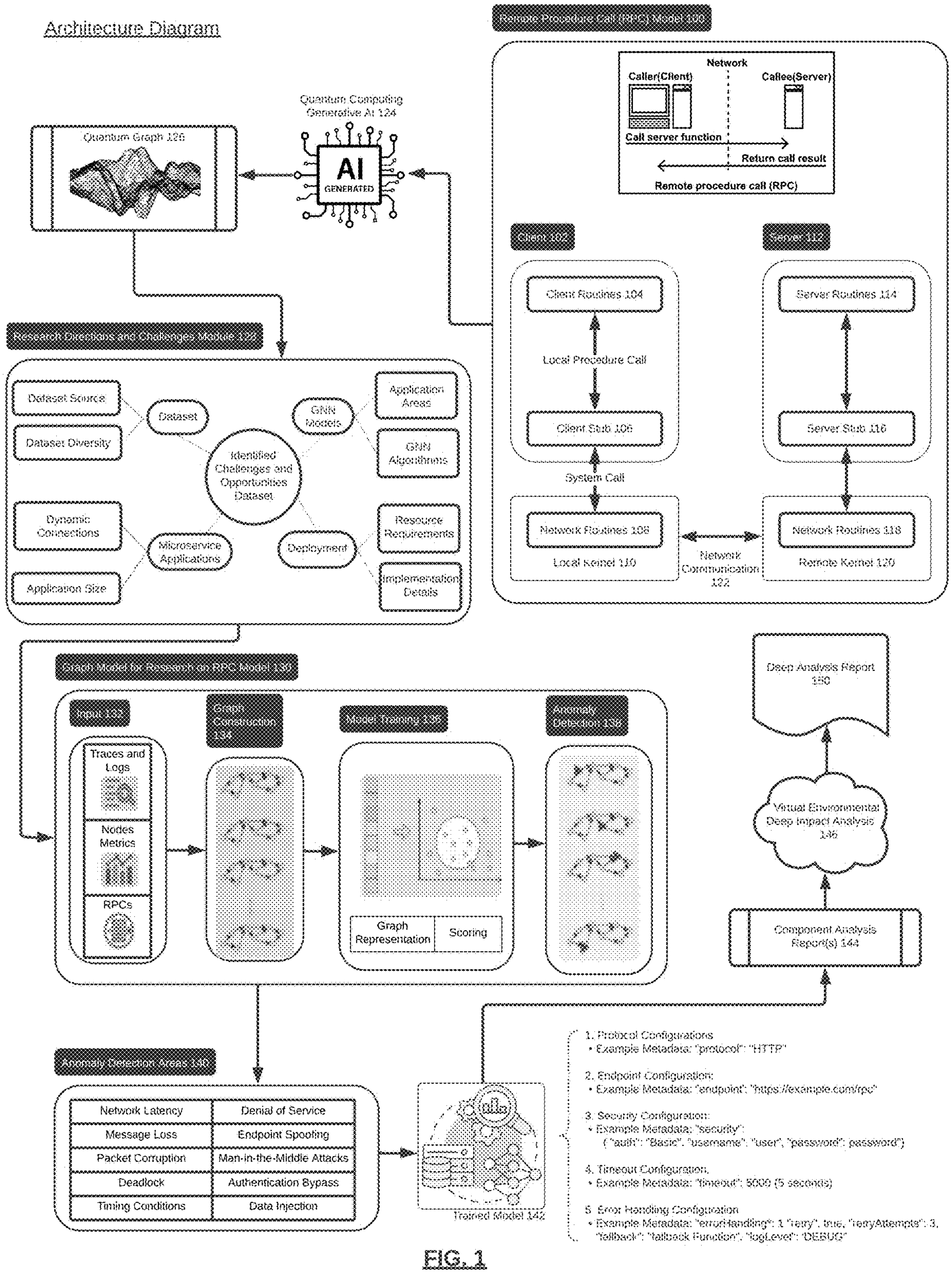
FIG. 1 illustrates the architecture of a proactive real-time anomaly detection system for cross-environment RPC calls, utilizing an intelligent GraphRPC method. It details the integration of client and server components, network routines, and a Generative AI module that employs quantum computing for dynamic graph generation and anomaly detection.

At a high level, the invention introduces a proactive real-time anomaly detection system specifically designed for managing cross-environment Remote Procedure Calls (RPCs). This advanced system employs a unique GraphRPC method that integrates seamlessly with existing monitoring infrastructures, enhancing the detection and resolution of anomalies in real-time, thereby bolstering data security and maintaining operational integrity. One of the core features of this system is its use of advanced graph analysis techniques, which allow for quick and intelligent identification of faults, significantly reducing the incidence of errors in RPC communications. These techniques enable the system to monitor interactions continuously through both real-time and aggregated dependency graphs, proactively identifying potential threats and mitigating risks before they escalate.

Furthermore, the system leverages quantum computing to generate and update a quantum graph dynamically. This graph captures complex dependencies and interactions within the RPC network, providing a robust framework for anomaly detection. The integration of Generative AI facilitates dynamic resource management, optimizing system responses and resource allocation based on real-time data.

This allows for the system to adjust dynamically to varying loads and conditions, ensuring optimal performance and resource efficiency.

Additionally, the system features self-healing capabilities that automatically detect and resolve issues within microservices, thus maintaining uninterrupted system performance and minimizing downtime. Continuous optimization is another standout feature, where the AI-driven system refines microservice interactions and configurations continuously to ensure the network operates at peak efficiency. By adopting these innovative features, the invention not only strengthens fault detection and workflow management but also minimizes risks associated with cross-RPC calls, significantly enhancing operational effectiveness and data security across financial systems. This comprehensive approach to managing and securing RPC communications addresses the critical challenges faced by financial institutions in safeguarding sensitive data and maintaining robust transactional systems.

The following account of various example embodiments is designed to fulfill the objectives mentioned earlier, with reference to the accompanying illustrations that are relevant to this disclosure. These illustrations demonstrate multiple systems and methods for implementing the disclosed information. It is important to acknowledge that there are alternative implementations possible, and adjustments to both structure and functionality can be applied. The description outlines various links between elements, which are to be interpreted broadly. Unless specified otherwise, these connections can be either direct or indirect, and may be established through wired or wireless means. This document does not intend to limit the nature of these connections.

Terms like "computers," "machines," and similar phrases are interchangeably used herein, depending on the context, to refer to devices that can be general-purpose or specialized, designed for particular functions, either virtual or physical, or capable of connecting to networks. This includes all relevant hardware, software, and components familiar to those with expertise in the area. Such devices may be outfitted with specialized circuits like application-specific integrated circuits (ASICs), microprocessors, cores, or other processing units to execute, access, control, or implement various types of software, instructions, data, modules, processes, or routines as mentioned. The usage of these terms in the text is not intended to be limiting or exclusive to any specific kinds of electronic devices or components and should be interpreted in the widest sense by those with relevant expertise. Specific details on computer/software components, machines, etc., are not provided for the sake of brevity and under the assumption that such information is within the realm of understanding of skilled professionals in the domain.

Software, executable code, data, modules, procedures, and similar components can be housed on tangible, computer-readable physical storage devices. This encompasses everything from local memory and network-attached storage to diverse forms of memory that are accessible, whether they are removable, remote, cloud-based, or available via other channels. These components can be saved on both volatile and non-volatile memory and might operate under various conditions, including autonomously, upon request, according to a predetermined schedule, spontaneously, proactively, or in response to specific triggers. They can be stored together or distributed among several computers or devices, incorporating their memory and other parts. Moreover, these components can be housed or disseminated across network-accessible storage systems, within distributed databases, big data frameworks, blockchains, or distributed ledger technologies, either collectively or through distributed arrangements.

The phrase "networks" or similar terms refer to a broad range of communication systems, such as local area networks (LANs), wide area networks (WANs), the Internet, cloud-based networks, and both wired and wireless networks. This category also includes specialized networks like digital subscriber line (DSL) networks, frame relay networks, asynchronous transfer mode (ATM) networks, and virtual private networks (VPN), which may be interconnected in various ways. Networks are designed with specific interfaces to support different types of communications-internal, external, and managerial—with the capability to allocate virtual IP addresses (VIPs) to these interfaces as necessary. The architecture of a network is built upon an array of hardware and software elements. This includes, but is not limited to, access points, network adapters, buses, both wired and wireless ethernet adapters, firewalls, hubs, modems, routers, and switches, which may be positioned within the network, on its periphery, or outside. Software and executable instructions work on these components to enable network operations. Additionally, networks support HTTPS and a variety of other communication protocols, making them suitable for packet-based data transmission and communication.

As used herein, Generative Artificial Intelligence (AI) or the like refers to AI techniques that learn from a representation of training data and use it to generate new content that is similar to or inspired by existing data. Generated content may include human-like outputs such as natural language text, source code, images/videos, and audio samples. Generative AI solutions typically leverage open-source or vendor sourced (proprietary) models, and can be provisioned in a variety of ways, including, but not limited to, Application Program Interfaces (APIs), websites, search engines, and chatbots. Most often, Generative AI solutions are powered by Large Language Models (LLMs) which were pre-trained on large datasets using deep learning with over 500 million parameters and reinforcement learning methods. Any usage of Generative AI and LLMs is preferably governed by an Enterprise AI Policy and an Enterprise Model Risk Policy.

Generative artificial intelligence models have been evolving rapidly, with various organizations developing their own versions. Sample generative AI models that can be used in accordance with various aspects of this disclosure include but are not limited to: (1) OpenAI GPT Models: (a) GPT-3: Known for its ability to generate human-like text, it's widely used in applications ranging from writing assistance to conversation. (b) GPT-4: An advanced version of the GPT series with improved language understanding and generation capabilities. (2) Meta (formerly Facebook) AI Models-Meta LLAMA (Language Model Meta AI): Designed to understand and generate human language, with a focus on diverse applications and efficiency. (3) Google AI Models: (a) BERT (Bidirectional Encoder Representations from Transformers): Primarily used for understanding the context of words in search queries. (b) T5 (Text-to-Text Transfer Transformer): A versatile model that converts all language problems into a text-to-text format. (4) DeepMind AI Models: (a) GPT-3.5: A model similar to GPT-3, but with further refinements and improvements. (b) AlphaFold: A specialized model for predicting protein structures, significant in the field of biology and medicine. (5) NVIDIA AI Models-Megatron: A large, powerful transformer model designed for natural language processing tasks. (6) IBM AI Models—Watson: Known for its application in various fields for processing and analyzing large amounts of natural language data. (7) XLNet: An extension of the Transformer model, outperforming BERT in several benchmarks. (8) GROVER: Designed for detecting and generating news articles, useful in understanding media-related content. These models represent a range of applications and capabilities in the field of generative AI. One or more of the foregoing may be used herein as desired. All are considered to be within the sphere and scope of this disclosure.

Generative AI and LLMs can be used in various aspects of this disclosure performing one or more various tasks, as desired, including: (1) Natural Language Processing (NLP): This involves understanding, interpreting, and generating human language. (2) Data Analysis and Insight Generation: Including trend analysis, pattern recognition, and generating predictions and forecasts based on historical data. (3) Information Retrieval and Storage: Efficiently managing and accessing large data sets. (4) Software Development Lifecycle: Encompassing programming, application development, deployment, along with code testing and debugging. (5) Real-Time Processing: Handling tasks that require immediate processing and response. (6) Context-Sensitive Translations and Analysis: Providing accurate translations and analyses that consider the context of the situation. (7) Complex Query Handling: Utilizing chatbots and other tools to respond to intricate queries. (8) Data Management: Processing, searching, retrieving, and utilizing large quantities of information effectively. (9) Data Classification: Categorizing and classifying data for better organization and analysis. (10) Feedback Learning: Processes whereby AI/LLMs improve performance based on feedback it receives. (Key aspects can include, for example, human feedback, Reinforcement Learning, interactive learning, iterative improvement, adaptation, etc.). (11) Context Determination: Identifying the relevant context in various scenarios. (12) Writing Assistance: Offering help in composing human-like text for various forms of writing. (13) Language Analysis: Analyzing language structures and semantics. (14) Comprehensive Search Capabilities: Performing detailed and extensive searches across vast data sets. (15) Question Answering: Providing accurate answers to user queries. (16) Sentiment Analysis: Analyzing and interpreting emotions or opinions from text. (17) Decision-Making Support: Providing insights that aid in making informed decisions. (18) Information Summarization: Condensing information into concise summaries. (19) Creative Content Generation: Producing original and imaginative content. (20) Language Translation: Converting text or speech from one language to another.

By way of non-limiting disclosure, FIG. 1 depicts a complex architecture diagram for a proactive real-time anomaly detection system in cross-environment RPC calls, leveraging an advanced GraphRPC method. This detailed diagram illustrates a multi-faceted system designed to handle, analyze, and secure RPC communications across various network environments, incorporating both traditional and quantum computing elements to enhance functionality and security.

The Client module, labeled as 102, plays a role in initiating RPC communications. It consists of several subcomponents including Client Routines (104), which handle the logic and execution of RPC calls; Client Stub (106), which provides an abstraction layer that simplifies the interface for making Local Procedure Calls; and Network Routines (108), which manage the data transmission across the network infrastructure. A Local Kernel (110) processes the RPC calls locally before they are transmitted, ensuring that the data is correctly formatted and secured for network travel.

On the Server side, labeled as 112, the structure mirrors that of the client to efficiently manage incoming RPC requests. It includes Server Routines (114) that receive and interpret the RPC calls, and Server Stub (116) that acts as the counterpart to the client stub, unpacking and directing the requests to appropriate handlers. The Remote Kernel (120) processes these requests with the aid of Server Network Routines (118), completing the communication cycle by ensuring that responses are accurately generated and sent back to the client.

Linking these components is the Network Communication path (122), which is beneficial for the secure and efficient exchange of RPC data between the client and server modules. This path handles all data transmissions, ensuring they are secure and meet the latency and throughput requirements of the system.

The integration of Quantum Computing and Generative AI (124) within the architecture introduces a cutting-edge approach to managing the Quantum Graph (126), a dynamic and complex data structure that maps out the interactions and dependencies of RPC components. This graph is continually updated and analyzed to detect anomalies and potential security threats in real-time, providing a robust tool for proactive system monitoring. This quantum graph is an integral part of the system, developed and manipulated using principles of quantum computing to enhance the detection of anomalies in RPC calls.

The quantum graph in the system represents a complex network or data structure that encodes the relationships and interactions between various components of the RPC system, such as client routines, server routines, and the various paths through which data travels. In a typical RPC environment, these components interact in ways that are dynamic and can vary significantly in real-time, necessitating a robust system for monitoring and analysis.

Quantum graphs leverage the principles of quantum mechanics, specifically superposition and entanglement, to process and store information in ways that are fundamentally different from classical graphs. Superposition allows quantum graphs to represent multiple states or conditions of a network simultaneously, which is particularly advantageous for anomaly detection systems. This capability enables the system to consider various potential configurations and interactions within the RPC network concurrently, swiftly identifying deviations from expected patterns. Entanglement ensures that elements of the graph, such as nodes representing RPC endpoints, are correlated such that the state of one node, whether normal or anomalous, directly influences the state of another, even over large distances. This property allows for immediate reflection of changes across the entire network, thus enhancing the system's response time and sensitivity to anomalies.

In the architecture of FIG. 1, the quantum graph plays a beneficial role in real-time anomaly detection. It dynamically updates as new RPC calls are made and as existing calls are processed. This continual updating process allows the system to immediately reflect any changes in the network's state, aiding in the rapid detection of anomalies. The quantum graph also helps manage the complexity inherent in RPC networks, which can involve numerous endpoints and interactions. By providing a unified view of the network, the quantum graph can be analyzed more effectively than traditional data structures, aiding in both management and security. Additionally, by analyzing the quantum graph, the system can proactively predict potential security breaches and operational failures before they occur, based on unusual patterns or changes in the graph structure.

Using a quantum graph for RPC anomaly detection means that the system can operate with a high degree of accuracy and efficiency, handling vast amounts of data and interactions at speeds unachievable with classical computing technologies. This capability is particularly beneficial in environments like banking and finance, where real-time data integrity and security are paramount. In summary, the quantum graph in this RPC anomaly detection system represents a sophisticated use of quantum computing technologies to enhance the system's ability to monitor, analyze, and respond to anomalies in RPC communications. This approach not only improves the reliability and security of the system but also positions it at the forefront of modern technological applications in cybersecurity and network management.

Adjacent to these advanced components, the Research Directions and Challenges Module (128) and the Graph Model for Research on RPC (130) reflect the system's dedication to continuous improvement and adaptation. These modules focus on identifying and addressing emerging challenges in RPC communication security, leveraging ongoing research to refine and expand the system's capabilities.

Research Directions and Challenges Module (128) includes several key areas that are beneficial for advancing the RPC anomaly detection system's capabilities and effectiveness. This module addresses a comprehensive range of components necessary for optimizing the GraphRPC method, focusing on datasets, algorithms, application areas, and deployment challenges.

a. Application and Dataset Source Areas: This component of the module emphasizes the importance of identifying and utilizing appropriate sources for the datasets that will feed into the anomaly detection system. It involves determining the origins of data, which are beneficial for ensuring the relevance and accuracy of the information processed by the system. These sources might include real-time transaction logs, historical RPC call data, or synthetic datasets created to model specific types of network anomalies.

b. GNN Dataset Models: This section relates to the development and refinement of Graph Neural Network (GNN) models that are tailored to analyze the RPC call data. GNNs are particularly suited for this task because they excel in capturing the relational information within graph-structured data, which is a fundamental aspect of modeling RPC networks.

c. Dataset Diversity: Ensuring dataset diversity is beneficial for the robustness of the anomaly detection system. This part of the module focuses on incorporating a wide range of data scenarios, including different types of RPC calls, variations in network conditions, and diverse anomaly types. This diversity helps in training the system to accurately detect anomalies under various conditions and reduces the likelihood of biases.

d. GNN Identified Algorithms: This component involves identifying and implementing the most effective GNN algorithms for the specific task of RPC anomaly detection. It includes researching state-of-the-art algorithms and possibly developing new ones that can improve the accuracy and efficiency of the anomaly detection process.

e. Challenges and Opportunities: This area provides an analysis of the existing challenges and emerging opportunities within the realm of RPC anomaly detection. It could cover issues such as scalability of the system, handling of encrypted data, real-time processing needs, and the integration of new quantum computing techniques. This part encourages ongoing research and adaptation to continually enhance the system's capabilities.

f. Dynamic Resource Connections: This segment focuses on the dynamic management of resource connections, essential for maintaining the performance and reliability of the system in real-time. It involves strategies for dynamically adjusting resources based on the current load and specific requirements of the network, ensuring efficient data processing and energy utilization.

g. Requirements Microservice Deployment: Here, the focus is on the deployment of microservices that are capable of fulfilling the specific requirements of the anomaly detection system. This includes the design and implementation of microservices that can independently handle different aspects of the RPC monitoring and anomaly detection process, ensuring modularity and ease of maintenance.

h. Application Size Implementation Details: This part of the module considers the scale of applications and the detailed planning required to implement such systems effectively. It addresses considerations related to the size of the network being monitored, the volume of data processed, and the computational power required, ensuring that the system is scalable and adaptable to different sizes and types of networks.

Consequently, the Research Directions and Challenges Module is designed to guide the continuous improvement of the RPC anomaly detection system. By addressing these specific areas, the module aids in refining the system's approach to handling real-time data, improving anomaly detection accuracy, and ensuring the system is adaptable to the evolving landscape of network security threats.

The Graph Model for Research (130) a sophisticated component of the anomaly detection system, designed specifically to analyze and map the complex interactions within RPC networks. It employs graph-based methodologies to construct a detailed representation of the network, where nodes symbolize RPC endpoints or network components, and edges depict the interactions or data flows between these nodes. This graphical representation is beneficial as it allows researchers to visually and analytically discern patterns and anomalies in RPC calls, evaluate the effects of various network conditions, simulate potential security threats, and experiment with developing new algorithms aimed at enhancing anomaly detection and network optimization.

The input (132) to the Graph Model is comprehensive and derived from several key sources: traces and logs, node metrics, and detailed RPC information. Traces and logs are essential as they provide a sequential record of events within the network, capturing the pathways of RPC calls and recording operational events that could indicate issues or anomalies. This sequential data helps in tracing the flow of RPC calls across the network, understanding the operational context, and pinpointing the origin of failures. Node metrics offer insights into the performance and health of each network component, with data on CPU usage, memory usage, response times, and overall availability. These metrics are instrumental in evaluating the efficiency and potential bottlenecks within the network, enabling proactive management of resources and system optimization. Detailed information about the RPCs, including the type of calls, their frequency, and specific characteristics, lays the groundwork for analyzing how RPCs interact within the network and how these interactions affect the network's performance and security.

Graph Construction (134) is a meticulous process that involves several detailed steps to transform the diverse input data into a structured graph format, which is then used for in-depth analysis and research. The process starts with the aggregation of data, where all relevant data points from traces, logs, node metrics, and RPC details are collected. This aggregated data ensures a rich dataset that reflects the true complexity of the network. Following data aggregation, nodes and edges are defined based on this data-nodes typically represent servers, clients, and other network components, while edges represent the communication or data flows between them. Each node and edge is assigned specific attributes reflecting operational metrics or interaction types, which enrich the graph with detailed contextual information. For instance, nodes might be assigned attributes such as CPU load or memory usage, and edges might carry attributes like data packet size or transaction type. Lastly, the graph is optimized using advanced algorithms that enhance its structure for better performance and more accurate analysis. Techniques such as graph pruning are employed to remove irrelevant or non-critical nodes and edges, simplifying the graph without losing important information. Clustering algorithms might also be used to group similar nodes together, which helps in isolating patterns or anomalies within certain areas of the network.

By utilizing this detailed and structured approach to building and analyzing the Graph Model for Research, the system not only gains a deep understanding of RPC dynamics but also fosters significant improvements in monitoring capabilities, anomaly detection accuracy, and overall network optimization. The continuous refinement and expansion of this model ensure that the anomaly detection system is adaptable and robust, ready to meet current and future challenges in network security and performance management.

Thus, the process flow starts with Input (132), which leads to Graph Construction (134). This phase is beneficial for building a foundational representation of all RPC interactions that the system will monitor. Following this, Model Training (136) utilizes historical data to educate the system on normal versus anomalous patterns, enhancing its ability to recognize and respond to anomalies during the Anomaly Detection phase (138). The detailed enumeration of Anomaly Detection Areas (140) showcases the system's comprehensive monitoring capabilities, highlighting its effectiveness in identifying a wide range of potential issues.

Moreover, the architecture specifies various configurations that underpin the system's operation: Protocol Configurations detail the use of HTTP protocols; Endpoint Configurations outline how endpoints are structured; Security Configurations ensure robust authentication and security measures; Timeout Configurations manage system responsiveness; and Error Handling Configurations dictate how errors are processed and rectified. These configurations are beneficial for tailoring the system to specific operational environments and requirements.

Model Training (136) is a phase where the system learns to identify and predict anomalies within the RPC network. This training is based on the graph representation of the network, meticulously constructed from the aggregated and processed data. During the model training phase, the system employs machine learning algorithms, specifically designed to interpret graph data, to learn from historical RPC interactions represented in the graph. This involves both supervised and unsupervised learning techniques, depending on the availability and labeling of training data.

The graph representation used in this training is a structured format where nodes represent various RPC components such as servers, clients, and intermediaries, while edges depict the interactions or communications between these nodes. Each node and edge in the graph is enriched with attributes derived from node metrics and interaction types, as previously defined in the graph construction phase. These attributes might include, but are not limited to, performance metrics like latency, throughput, and error rates for nodes, and transaction types, sizes, and durations for edges. This detailed representation allows the system to understand and analyze the complex relationships and dependencies within the network.

Scoring is an integral part of the model training process. It involves evaluating the effectiveness of the model using various metrics such as accuracy, precision, recall, and F1-score. The scoring process helps in refining the model by adjusting parameters and improving the learning algorithms based on the performance outcomes. The model is trained iteratively; with each iteration, the scoring metrics are analyzed to gauge the model's capability in accurately identifying known patterns of anomalies. The objective is to optimize the model to a point where it achieves high reliability in predicting potential issues without generating excessive false positives.

Following the Model Training, the Anomaly Detection (138) phase becomes active. Here, the trained model is applied in real-time to detect anomalies as new RPC data is processed. The anomaly detection system continuously monitors the network's graph representation, now dynamically updated with live data, and uses the trained model to evaluate incoming interactions. When the model identifies deviations from established patterns that suggest potential anomalies, it triggers alerts. These anomalies could range from simple performance degradation, unexpected spikes in data traffic, to signs of security breaches like unauthorized access attempts.

The process of anomaly detection not only focuses on identifying these issues but also involves classifying the severity and potential impact of each detected anomaly. This classification helps in prioritizing responses and allocating resources more effectively. Moreover, the system's response to detected anomalies can be configured according to the severity and type of anomaly detected. For example, in cases of minor anomalies, the system might simply log the incident for later review, whereas for severe anomalies, it could initiate automated corrective actions or alert network administrators for immediate intervention.

A range of anomaly detection areas (140) is beneficial for maintaining the integrity and efficiency of RPC networks. These areas include performance degradations, where the system identifies unusual delays or bottlenecks that could impact network operations. Traffic spikes, whether from legitimate high demand or potential Denial of Service (DOS) attacks, are closely monitored to ensure that they do not disrupt service continuity. Unauthorized access attempts are flagged, helping to prevent potential security breaches that aim to access sensitive data or disrupt services.

The system also guards against data integrity issues, crucial in sectors like banking, where data accuracy is paramount. This includes monitoring for corrupted data packets or discrepancies in data synchronization which could compromise the reliability of financial transactions. Protocol violations are also detected, ensuring all network communications adhere to established standards and helping to avoid misconfigurations or cyber-attacks.

Network security threats such as malware, spyware, and ransomware are part of the broader security monitoring framework. The system's ability to identify behaviors deviating from the norm helps in early detection of these threats, safeguarding the network against various forms of cyber intrusions.

Additional areas monitored include network latency issues that could indicate underlying problems affecting network performance and responsiveness. Message loss and packet corruption are also detected, both of which can severely impact data flow and integrity. The system addresses advanced security challenges such as Endpoint Spoofing and Man-in-the-Middle attacks, which deceive the network about identities or alter communications between two parties without their knowledge. Deadlocks and authentication bypass incidents, where the normal security checks are circumvented, are quickly identified to prevent unauthorized access and system misuse.

Furthermore, the anomaly detection extends to monitoring timing conditions and data injection attacks, where malicious data is inserted into the system. Such activities can lead to erroneous operations or unauthorized data exposure. By actively monitoring and responding to these diverse anomaly detection areas, the system not only prevents minor issues from escalating into severe problems but also significantly enhances the overall security posture of the network. This proactive approach to anomaly detection is vital for networks, especially those in critical sectors, ensuring they maintain high standards of reliability and security.

Through this detailed approach to model training and anomaly detection, the system ensures a high degree of surveillance and responsiveness, making it an effective tool for maintaining the integrity and performance of RPC networks in real-time. This ongoing cycle of training, scoring, and detecting not only helps in maintaining current network efficiency but also adapts to new threats and changes within the network environment.

The formation of a trained model (142) in the context of the RPC anomaly detection system outlined in FIG. 1 involves several detailed steps, leveraging the data prepared and processed through earlier phases of graph construction and initial model training. The trained model is essentially the product of an iterative learning process that uses historical and real-time data to predict and identify anomalies in network behavior accurately. The model can be formed, for example, by one or more of the following steps.

a. Data Preparation and Preprocessing: The first step towards forming a trained model is the preparation and preprocessing of data. This includes gathering a comprehensive set of data from the network, which typically involves traces, logs, node metrics, RPC details, and any other relevant information that can influence the understanding of network behavior. This data is then cleaned and formatted, which may involve normalizing data, handling missing values, and converting data into a format suitable for analysis, such as numerical values that can be processed by machine learning algorithms.

b. Graph Construction: As described earlier, the input data is used to construct a detailed graph that represents the interactions and dependencies within the network. This graph effectively captures the complex relationships and structures within the RPC network, with nodes representing network components and edges depicting the interactions between these components. Attributes assigned to nodes and edges reflect various metrics and characteristics, such as latency, traffic volume, or error rates, which are beneficial for understanding the behavior under normal and anomalous conditions.

c. Feature Selection: In the feature selection phase, important features that significantly influence the outcome of anomaly detection are identified. This can involve statistical techniques to evaluate the importance of various attributes and their correlation with anomalous events. Feature selection helps in enhancing the model's efficiency by reducing the dimensionality of the data and focusing the learning process on the most relevant features.

d. Model Training and Validation: With the graph constructed and features selected, the actual training of the model begins. This typically involves dividing the data into training and validation sets. The training set is used to teach the model how to recognize patterns and anomalies, while the validation set is used to evaluate the model's accuracy and generalization capabilities. Machine learning algorithms suitable for graph data, such as Graph Neural Networks (GNNs), are employed during this phase. These algorithms can effectively process the graph-structured data, learning the normal patterns of network behavior and identifying deviations that signify anomalies.

e. Algorithm Optimization: During training, various parameters of the algorithms are tuned to optimize performance. This process, known as hyperparameter optimization, involves adjusting settings like learning rate, number of layers in neural networks, or decision thresholds, to improve the model's ability to accurately detect anomalies. Techniques such as cross-validation are used to ensure that the model performs well not just on the training data, but also on unseen data, thereby preventing issues like overfitting.

f. Scoring and Evaluation: Once the model is trained, it is scored using the validation set to assess its performance based on metrics such as accuracy, precision, recall, and F1-score. These metrics provide insights into how well the model can identify true anomalies versus normal behavior, and how often it correctly identifies real incidents of anomalies. Adjustments might be made based on this feedback to refine the model further.

g. Deployment: The final trained model (142) is then ready to be deployed within the system, where it will continuously analyze incoming network data. As new data is processed, the model uses its learned knowledge to predict and flag potential anomalies in real time, enabling proactive measures to mitigate risks associated with these anomalies.

The formation of a trained model is a dynamic and ongoing process, where the model may be periodically retrained or fine-tuned with new data and insights, ensuring its effectiveness and adaptability as network behaviors and external conditions evolve.

Lastly, the Component Analysis Report(s) (144) and the Virtual Environmental Deep Impact Analysis (146) represent the evaluative aspects of the system, providing deep insights into the performance and environmental impact of the configuration settings. These reports are instrumental in diagnosing system health, optimizing performance, and ensuring that the architecture meets both current and future demands effectively.

More specifically, regarding the Component Analysis Report(s) (144), they serve as a beneficial tool for evaluating the performance, efficiency, and security of each component within the RPC network. These reports are generated based on the data collected, analyzed, and interpreted through the various phases of the system's operation, particularly focusing on the outputs from the trained model.

The primary purpose of the Component Analysis Reports is to provide a detailed and structured assessment of each network component's status and behavior over time. These reports help network administrators and security professionals understand how individual components contribute to the overall system performance and identify potential vulnerabilities or inefficiencies that may require attention or corrective action.

The foundation of these reports is the comprehensive data collection from the network. This includes not only real-time operational data but also historical data stored during regular network activities. Key data points might include metrics on traffic volume, processing times, error rates, and security incidents associated with each component. The data is aggregated from various sources within the network, such as logs, performance monitors, security systems, and the anomaly detection system itself.

Once collected, the data undergoes a thorough analysis to extract meaningful insights about the health and performance of network components. Advanced analytics tools and machine learning models are employed to identify patterns or trends that may indicate underlying issues. For instance, a sudden increase in error rates or a gradual decline in performance metrics for a particular server might suggest hardware issues, configuration errors, or potential security threats.

The insights gained from data analysis are then compiled into detailed reports that are generated. These reports can include, for example, one or more of:

a. Performance Metrics: Detailed statistics on each component's operational efficiency, such as uptime, throughput, and response times. Comparisons with historical performance levels can also be included to highlight trends or deviations.

b. Security Analysis: Information on any security incidents or anomalies detected related to each component. This might include details of attempted security breaches, detected vulnerabilities, or compliance issues.

c. Recommendations: Based on the analysis, the reports might also include actionable recommendations for improving performance or security. This could involve suggestions for hardware upgrades, changes in configuration settings, or updates to security protocols.

d. Visualizations: Graphs, charts, and heat maps to visually represent the data, making it easier to identify patterns or anomalies at a glance.

Component Analysis Reports can be used by various stakeholders within the organization to make informed decisions about network management and security. Network engineers might use the reports to optimize network performance and plan for capacity upgrades. Security teams use the reports to strengthen the network's defenses and respond to vulnerabilities. Management teams might review these reports to understand the broader impact of network performance on business operations and to justify investments in network infrastructure.

Finally, the Component Analysis Reports contribute to a cycle of continuous improvement within the network. By regularly reviewing these reports, the organization can proactively manage its network resources, adapt to evolving demands, and respond swiftly to emerging security threats. This ongoing analysis and reporting ensure that the network remains robust, efficient, and secure, aligned with the organization's operational needs and strategic goals.

The Virtual Environmental Deep Impact Analysis (146) featured in the architecture of the proactive real-time anomaly detection system is a comprehensive evaluation process designed to assess the impact of various components and configurations within a virtualized network environment. This analysis aims to understand deeply how changes to the network's setup might affect overall system performance, security, and stability.

The main objective of this analysis is to simulate and predict the consequences of potential changes in the network environment before they are actually implemented. By using a virtualized approach, the system can explore various scenarios, including hardware changes, software updates, and security patches, without risking the integrity or stability of the live network. This proactive approach helps in identifying potential issues and optimizing configurations to ensure they will function as intended when deployed in the real environment. The process of deep impact analysis is as follows:

a. Virtualization of Network Environment: The first step involves creating a virtual model of the network that accurately reflects its various components and configurations. This virtual model is typically hosted in an isolated environment where changes can be implemented and tested without affecting the actual network operations.

b. Implementation of Changes: Within this virtual environment, proposed changes are systematically implemented. These might include new network configurations, software updates, integration of new hardware, or alterations in security settings. Each change is applied individually to isolate its effects, though in some cases, combinations of changes may also be tested to understand interactions between different elements.

c. Simulation and Testing: With the changes in place, the virtual environment is used to simulate network operations under various conditions. This might include normal operation, peak load scenarios, and under attack conditions to gauge the resilience of the network. The simulations are designed to be thorough, covering a wide range of operational and stress scenarios to fully assess the impact of the changes.

d. Monitoring and Data Collection: Throughout the testing phase, detailed monitoring tools collect data on performance, stability, and security outcomes. Key metrics such as response times, throughput rates, error rates, and security breach attempts are recorded to provide a quantitative basis for analysis.

e. Analysis and Reporting: The collected data is analyzed to determine the impact of the changes on the network. The analysis looks for any signs of degraded performance, new vulnerabilities, or other adverse effects that could compromise the network's effectiveness or security. The findings are then compiled into detailed reports that outline the risks and benefits associated with each change.

f. Recommendations and Adjustments: Based on the analysis, recommendations are made regarding whether the proposed changes should be adopted, modified, or rejected. In some cases, adjustments might be suggested to optimize the configurations for better performance or security. These recommendations are beneficial for decision-making processes related to network management and upgrades.

The Virtual Environmental Deep Impact Analysis offers several benefits:

a. Risk Mitigation: By testing changes in a virtual environment, the organization can avoid potential disruptions or damages that might occur from directly implementing changes in the live network.
b. Cost Efficiency: It reduces the costs associated with trial-and-error methods in live environments, as changes can be tested without the need for physical resources or risking existing operations.
c. Informed Decision Making: Provides detailed insights and data-driven recommendations that help stakeholders make well-informed decisions about network upgrades and configurations.

Thus, the Virtual Environmental Deep Impact Analysis is a beneficial tool for ensuring that network changes lead to improvements rather than problems, supporting ongoing efforts to enhance network reliability, performance, and security in a controlled and systematic manner.

The Deep Analysis Report (150) within the proactive real-time anomaly detection system is a pivotal document that compiles extensive evaluative data about the network's performance, security, and overall health. This report is generated after thorough assessments, including those conducted through the Virtual Environmental Deep Impact Analysis (146), and serves to inform network administrators, security teams, and decision-makers about the critical aspects of the network's operations.

The report begins with a comprehensive performance analysis that details metrics such as latency, throughput, error rates, and system uptime. This analysis provides a clear view of how well different components of the network are performing, highlighting any areas where performance may be lagging or where there is potential for future problems. Such insights are beneficial for proactive maintenance and for planning upgrades that enhance network efficiency and reliability.

Security is another aspect covered extensively in the report. It includes findings from recent security audits, vulnerability scans, and incident response analyses. This section outlines any new or unresolved security threats, details attempted breaches or security anomalies detected by the system, and evaluates the effectiveness of the current security measures. The security analysis aims to identify patterns or trends in security incidents, which can help in fortifying the network against future attacks.

Additionally, the report includes a detailed evaluation of the network's compliance with relevant regulations and standards. This ensures that the network not only performs well but also adheres to industry best practices and legal requirements, which is particularly beneficial in various sectors where data protection and privacy are regulated strictly.

The Deep Analysis Report also offers strategic recommendations based on the data collected and the insights derived from the analysis. These recommendations are tailored to address specific issues identified during the analysis, such as enhancing certain security protocols, upgrading hardware to improve performance, or reconfiguring the network to eliminate bottlenecks. Each recommendation is accompanied by a rationale, helping stakeholders understand the expected benefits and potential impacts of implementing these changes.

By providing a holistic view of the network's status and projecting future needs, the Deep Analysis Report facilitates informed decision-making that can significantly impact the network's efficiency, security, and compliance. It is an essential tool for continuous improvement, helping organizations adapt to evolving technological landscapes and emerging security challenges.

In essence, FIG. 1 offers a detailed view of an innovative system designed to enhance the security and efficiency of RPC communications across different environments through a blend of traditional and quantum computing techniques. The architecture not only addresses current security and operational needs but also adapts dynamically to evolving challenges, ensuring robust, future-ready RPC communication management.

Figure 2:
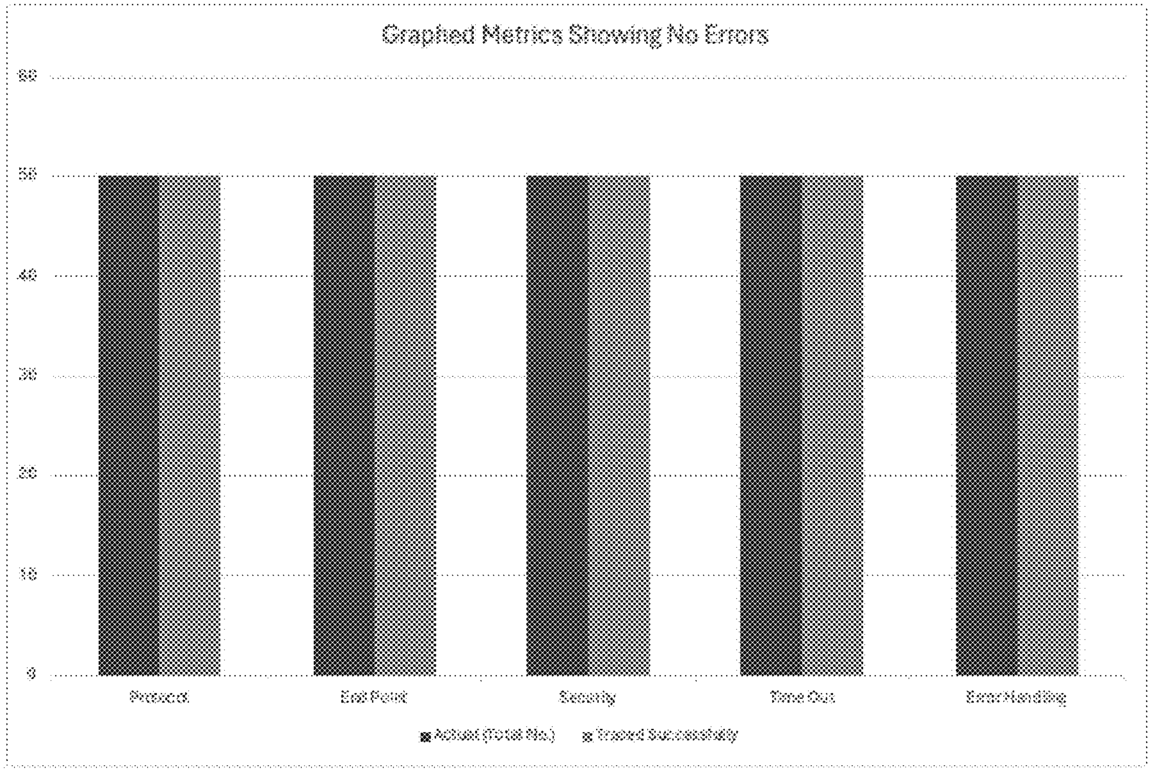
FIG. 2 displays a Sample Component Analysis Report for normal operation, showing perfect alignment in the monitoring of network components such as protocols, endpoints, security, timeouts, and error handling, with all metrics traced successfully. The accompanying bar graph visually confirms the 100% success rate across all categories, indicating optimal network operation without any errors.
Figure 3:
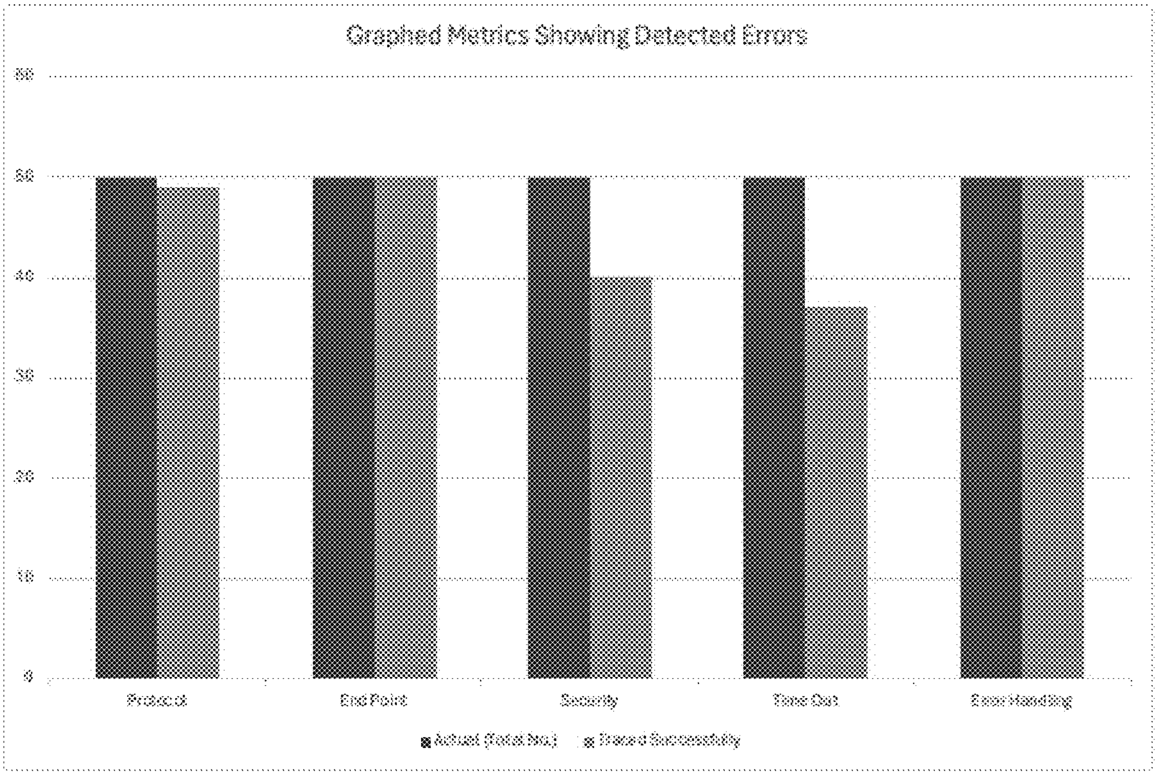
FIG. 3 presents a Sample Component Analysis Report for abnormal operation, where discrepancies are noted in the tracing of protocols, security, and timeouts, suggesting faults or inefficiencies. The bar graph in this figure highlights these discrepancies, visually depicting detected errors and underscoring areas that require attention or corrective action.

The Component Analysis Reports exemplified in FIGS. 2 and 3 are beneficial tools for managing and maintaining network health by closely monitoring various key configuration variables such as protocol, endpoint, security, timeout, and error handling. These reports provide detailed insights into the performance and reliability of the network under different operational conditions, enabling network administrators to identify and address issues promptly.

In FIG. 2, the Sample Component Analysis Report 200 for normal operation provides a clear snapshot of the network operating at optimal levels. Each configuration variable is closely monitored, with the results indicating a perfect alignment between the actual and traced numbers. Specifically, the report details that all 50 protocols, 50 endpoints, 50 security checks, 50 timeouts, and 50 error-handling protocols were successfully traced, reflecting a 100% efficiency rate. This flawless tracing is visually represented in a bar graph, which shows uniform success across all categories without any deviations, underscoring the network's stability and effective functioning. The graph serves not only as a validation of current network health but also sets a benchmark for expected performance under standard operating conditions.

Contrastingly, FIG. 3's Sample Component Analysis Report 300 for abnormal operation with errors detected presents a different scenario where the network faces several operational challenges. This report highlights discrepancies in the tracing of the protocol, security, and timeout configuration variables, indicating potential issues that could impact network performance and security. Specifically, the report shows a mismatch in the protocol where 49 out of 50 were successfully traced, pointing to minor issues in protocol handling. More concerning are the results for security and timeout configurations, where only 40 and 37 out of 50 instances were successfully traced, respectively. These gaps in security and timeout tracing suggest significant vulnerabilities and inefficiencies that could lead to security breaches or service delays. The bar graph included in this report effectively illustrates these problem areas, with clear visual indicators of where the traced numbers fall short of the actual figures, thereby directing attention to areas requiring urgent remedial actions.

The analysis provided by these reports is beneficial for proactive network management. By systematically monitoring these key configuration variables, network administrators can detect and diagnose the root causes of discrepancies and failures. The detailed data allows for targeted troubleshooting efforts, rather than broad, generalized interventions, making the remediation process more efficient and less disruptive. Furthermore, these reports contribute to strategic planning by informing decisions related to network upgrades, security enhancements, and the allocation of resources, ensuring the network remains robust against both current and future challenges.

Consequently, the deep insights offered by the Component Analysis Reports in FIGS. 2 and 3 enable a dynamic and responsive approach to network management. By maintaining rigorous monitoring standards and providing clear, actionable data, these reports play a pivotal role in sustaining network health, optimizing performance, and enhancing security protocols. This level of detailed analysis is indispensable for maintaining the high reliability and security standards necessary in today's complex network environments.

Figure 4:
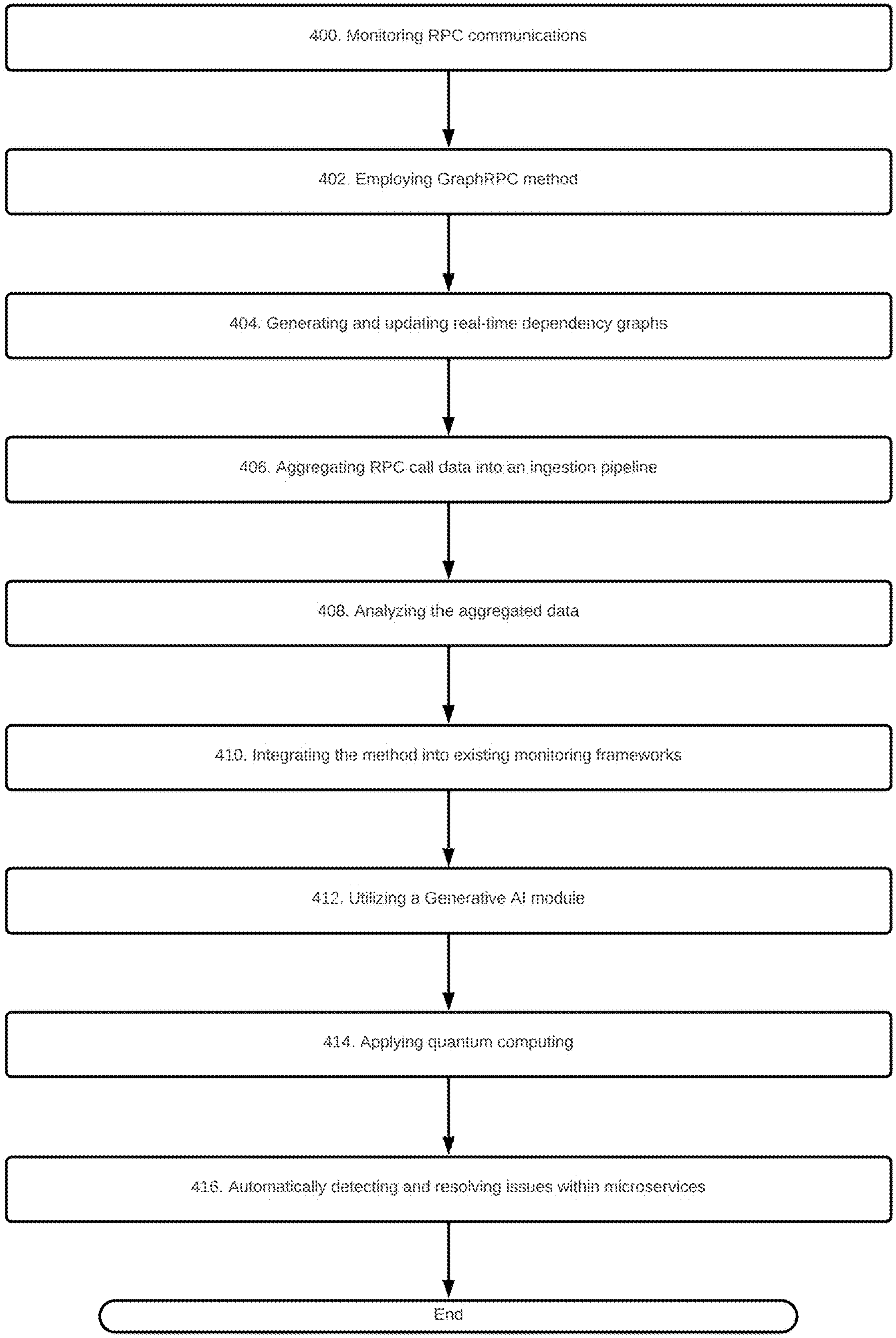
FIG. 4 presents a sample flow diagram of a method for proactive real-time anomaly detection in cross-environment RPC communications, illustrating the sequential steps involved from monitoring RPC communications to applying advanced analytical techniques for security and efficiency. The diagram encapsulates the integration of various technologies, including a GraphRPC method, quantum computing, and Generative AI modules, to enhance fault detection and ensure uninterrupted system operations through self-healing mechanisms.

FIG. 4 illustrates a comprehensive flow diagram depicting the method for proactive real-time anomaly detection in cross-environment RPC communications between multiple computing environments. This flow diagram is a sample representation of the steps involved in monitoring, analyzing, and responding to anomalies in RPC communications across different network environments, aimed at enhancing data security and operational efficiency.

The process begins at step 400, where RPC communications are continuously monitored in real-time between a staging environment and a production environment. This monitoring is beneficial for detecting any unauthorized or unintended data transfers, ensuring that only legitimate communications occur across the environments. The monitoring system employs sensors and analytical tools to scrutinize every piece of data transferred, looking for deviations from expected patterns that might indicate security breaches or data leakage.

Proceeding to step 402, the system employs the GraphRPC method, which utilizes advanced graph analysis techniques for intelligent real-time fault detection. This method enables the system to quickly identify and address anomalies before they escalate into more significant issues. The GraphRPC method analyzes the relationships and interactions within the RPC communications, using machine learning algorithms to enhance the detection capabilities and ensure a rapid response to potential threats.

At step 404, real-time dependency graphs are generated and dynamically updated to visually represent interactions and dependencies within the RPC communications. This step facilitates immediate monitoring and alerting, providing system administrators and security teams with a clear and current view of all network activities. The dynamic nature of these graphs ensures that any changes in the network's communication patterns are immediately reflected, allowing for quick action when anomalies are detected.

Step 406 involves aggregating RPC call data into an ingestion pipeline where the data is systematically collected and prepared for further analysis. This aggregation is beneficial for maintaining a comprehensive dataset that can be used for historical analysis and trend monitoring, helping to identify recurrent issues or potential areas of concern over time.

In step 408, the aggregated data is thoroughly analyzed using an aggregated graph model. This model identifies patterns indicative of potential security threats or operational inefficiencies. By analyzing historical and real-time data, the system can predict and prevent future anomalies, thereby enhancing the security and efficiency of RPC communications.

Step 410 involves integrating the anomaly detection method into existing monitoring and alerting frameworks. This integration helps streamline workflow management and enhances fault detection capabilities by creating a cohesive monitoring system that leverages both new and existing security infrastructures. The integration ensures that all parts of the network monitoring system work in harmony, providing a unified approach to security and performance management.

At step 412, a Generative AI module is utilized to enrich RPC transactions with additional metadata for enhanced anomaly detection and resolution. This AI module uses quantum computing algorithms, as indicated in step 414, to process the enriched metadata and identify complex patterns that may indicate potential vulnerabilities. This application of quantum computing significantly boosts the system's ability to analyze data at unprecedented speeds and with greater accuracy.

Finally, in step 416, the system automatically detects and resolves issues within microservices through self-healing mechanisms. These mechanisms are designed to maintain uninterrupted system operations, quickly restoring services and rerouting requests without human intervention whenever an anomaly is detected. This automated response is beneficial for minimizing downtime and ensuring that the network remains robust and reliable.

Overall, FIG. 4 effectively outlines a method that not only proactively monitors and detects anomalies but also integrates advanced technologies such as AI and quantum computing to ensure that the network's security and operational integrity are continuously upheld.

Figure 5:
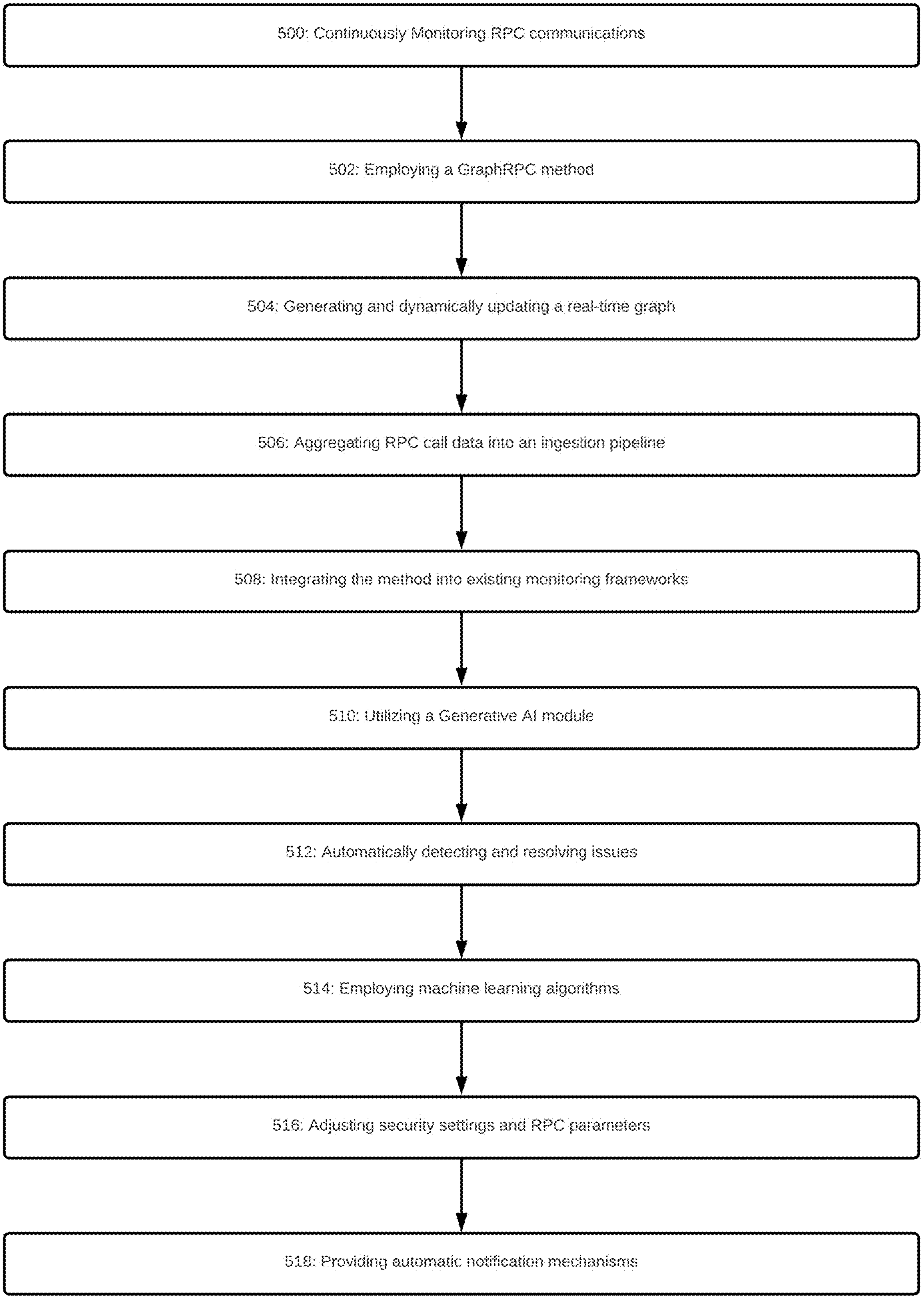
FIG. 5 illustrates another sample flow diagram for a proactive real-time anomaly detection method in cross-environment RPC communications, detailing a comprehensive sequence of steps that enhance system security and efficiency. The diagram includes steps such as continuous monitoring of RPC communications, employing advanced GraphRPC and AI technologies, and integrating self-healing mechanisms to maintain uninterrupted operations, all aimed at ensuring robust data integrity and operational responsiveness.

FIG. 5 displays a flow diagram that provides a detailed visualization of the method for proactive real-time anomaly detection in cross-environment RPC communications between multiple computing environments. This method integrates advanced technologies and methodologies to ensure robust system security and efficient operational management across various stages of RPC communication.

The process begins at step 500, where the system continuously monitors RPC communications between a staging environment and a production environment. This monitoring utilizes a network of sensors and detectors that analyze data flow and command execution patterns. The objective is to detect any unauthorized or unintended data transfers promptly, ensuring that only authorized commands are processed, which is beneficial for preventing data breaches and maintaining secure data transmission.

Proceeding to step 502, the system employs a GraphRPC method that incorporates advanced graph analysis techniques. This method is integral to the intelligent real-time fault detection capability of the system. It includes deploying machine learning algorithms that process and analyze graph data structures representing RPC interactions. This enables the system to quickly identify and address anomalies before they escalate, thereby significantly reducing the risk of operational disruptions.

At step 504, a real-time graph matrix is generated and dynamically updated. This graph visually represents interactions and dependencies within the RPC communications and is configured to refresh on a sub-second basis. This frequent updating is beneficial for reflecting real-time data flows and interactions across the network, ensuring swift detection and response to potential issues.

In step 506, the system aggregates RPC call data into an ingestion pipeline. This data is then stored for historical analysis. By employing an aggregated graph model, as described in step 508, the system provides a comprehensive historical view of service interactions and RPC data flows. This model enables in-depth analysis of system performance trends over time and facilitates the identification of patterns and optimization opportunities for long-term operational success.

The method is integrated into existing monitoring and alerting frameworks at step 508. This integration is designed to streamline workflow management and enhance fault detection. It involves configuring the anomaly detection system to work synchronously with legacy monitoring tools, thereby providing a unified view of security and performance metrics.

Step 510 sees the utilization of a Generative AI module, which enriches RPC transactions with additional metadata for enhanced anomaly detection and resolution. The metadata typically includes transaction type, frequency, and last execution times. Quantum computing algorithms are leveraged to process this metadata to predict and identify potential vulnerabilities based on complex pattern recognition.

Automatically detecting and resolving issues within microservices through self-healing mechanisms is detailed in step 512. This includes automatically rerouting traffic or requests to backup systems when anomalies are detected and restoring normal operation without human intervention, which is helpful for maintaining uninterrupted system operations.

In step 514, the system employs both supervised and unsupervised machine learning algorithms. These algorithms are programmed to predict and detect known and novel anomalous behavior patterns based on historical data comparisons and autonomous exploration of new data patterns. This capability allows for proactive adjustments to system configurations and parameters in anticipation of similar future events.

Step 516 involves adjusting security settings and RPC communication parameters in both the staging and production environments automatically. These adjustments are based on feedback mechanisms from detected anomalies and include dynamic adjustments to encryption levels and access controls.

Finally, step 518 details providing automatic notification mechanisms that are integrated within the system's monitoring and alerting frameworks. These mechanisms alert system administrators about detected anomalies, offering detailed reports on the nature, severity, and potential impact of the anomalies. They also include actionable recommendations for corrective actions tailored to specific system requirements and administrator preferences. Furthermore, manual override capabilities are enabled for system administrators to take immediate, informed actions to address and resolve the detected anomalies in the production environment, ensuring continuous operational integrity and security maintenance.

Figure 6:
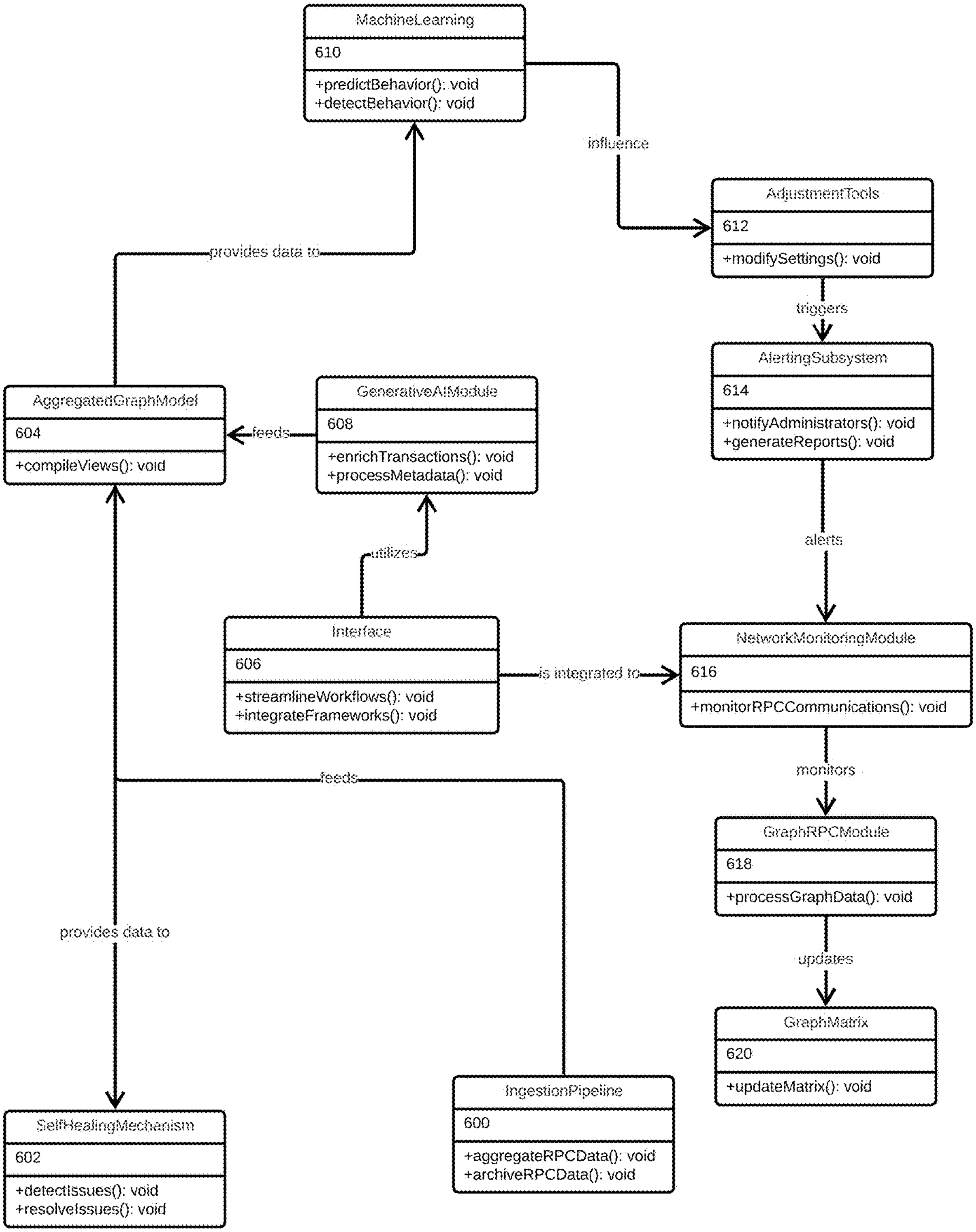
FIG. 6 displays a sample class-diagram architecture for proactive real-time anomaly detection in cross-environment RPC communications, outlining the various modules and their functionalities. The diagram highlights key components like the NetworkMonitoringModule, GraphRPCModule, and Generative AI Module, which work together to monitor, analyze, and respond to anomalies, ensuring robust network security and efficient operation management.

FIG. 6 presents a comprehensive diagram illustrating the system designed for proactive real-time anomaly detection in cross-environment RPC communications between multiple computing environments. This diagram is structured to show the various components and their interactions within the system, ensuring thorough monitoring, analysis, and response capabilities to maintain system integrity and security.

At the core of the diagram, the NetworkMonitoringModule (616) is tasked with continuously monitoring RPC communications between a staging environment and a production environment. This module leverages sensors and detectors to meticulously analyze data flow and command execution patterns, executing through the function monitorRPCCommunications( ) This persistent monitoring is helpful for detecting any unauthorized or unintended data transfers, thereby averting potential data breaches or operational disruptions.

Adjacent to this, the GraphRPCModule (618) harnesses advanced graph analysis techniques integrated with machine learning algorithms. The function processGraphData( ) within this module manages the processing of graph data structures representing RPC interactions. This function provides for intelligent real-time fault detection and swift anomaly resolution, allowing the system to address issues before they escalate significantly.

The GraphMatrix (620) plays a beneficial role by dynamically updating to visually represent interactions and dependencies within the RPC communications. The function updateMatrix( ) ensures that the matrix is refreshed on a sub-second basis to reflect real-time data flows and interactions, thus facilitating immediate monitoring and alerting. This real-time visualization aids administrators and security teams in quickly understanding the current state of network communications and responding to anomalies as they occur.

The IngestionPipeline (600) is configured for aggregating and archiving RPC call data. It features two functions: aggregateRPCData( ) and archiveRPCData( ) This pipeline feeds into the AggregatedGraphModel (604), which compiles comprehensive historical views of service interactions and RPC data flows through its function compileViews( ) This model enables deep analysis and identification of long-term patterns and optimization opportunities, beneficial for enhancing system performance and security over time.

The Interface (606) includes functions such as streamlineWorkflows( ) and integrateFrameworks( ) which help integrate the anomaly detection method into existing monitoring and alerting frameworks. This integration is designed to streamline workflow management and enhance fault detection by synchronizing with legacy monitoring tools, providing a unified view of security and performance metrics across environments.

The GenerativeAIModule (608) enriches RPC transactions with additional metadata and utilizes quantum computing algorithms for processing said metadata to predict and identify potential vulnerabilities. It houses functions enrichTransactions( ) and processMetadata( ) which support enhanced anomaly detection and resolution, leveraging advanced computational techniques to handle complex data analysis tasks quickly and accurately.

The SelfHealingMechanism (602) with its functions detectIssues( ) and resolveIssues( ) is engineered to automatically detect and resolve issues within microservices, including rerouting traffic or requests to backup systems and restoring operations without human intervention. This mechanism ensures the system remains resilient and operational even in the face of disruptions.

The MachineLearning (610) uses predictBehavior( ) and detectBehavior( ) functions, employing both supervised and unsupervised learning techniques to analyze historical and real-time data. This analysis helps predict and detect both known and novel anomalous behavior patterns, facilitating proactive adjustments to system configurations and parameters in anticipation of similar future events.

Lastly, the AdjustmentTools (612) with the function modifySettings( ) are configured to automatically modify security settings and RPC communication parameters in both the staging and production environments based on feedback from anomaly detection. The AlertingSubsystem (614) includes notifyAdministrators( ) and generateReports( ) This subsystem is integrated within the monitoring frameworks to provide automatic notifications to system administrators about detected anomalies, offering detailed anomaly reports with actionable corrective recommendations and manual override capabilities for immediate resolution.

Together, these interconnected components form a robust system that ensures continuous operational integrity and security maintenance by proactively detecting and responding to anomalies in real-time within RPC communications across multiple computing environments.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. A method for proactive real-time anomaly detection in cross-environment RPC communications between multiple computing environments, the method comprising the steps of:

continuously monitoring RPC communications in real-time between a staging environment and a production environment to detect any unauthorized or unintended data transfers, utilizing a network of sensors and detectors that analyze data flow and command execution patterns to ensure that only authorized commands are processed;

employing a GraphRPC method that utilizes advanced graph analysis techniques for intelligent real-time fault detection, which includes deploying machine learning algorithms to process and analyze graph data structures representing RPC interactions, enabling identification and resolution of anomalies before escalation, thereby reducing risk of data breaches or operational disruptions;

generating and dynamically updating a real-time graph matrix that visually represents interactions and dependencies within the RPC communications, facilitating immediate monitoring and alerting, wherein the graph matrix is updated on a sub-second basis to reflect real-time data flows and interactions across the network, ensuring swift detection and response to potential issues;

aggregating RPC call data into an ingestion pipeline and storing said data for historical analysis using an aggregated graph model that provides a comprehensive historical view of service interactions and RPC data flows, enabling in-depth analysis of system performance trends over time, and facilitating the identification of patterns and optimization opportunities for long-term operational success;

integrating the GraphRPC method into existing monitoring and alerting frameworks to streamline workflow management and enhance fault detection, wherein the integration includes configuring an anomaly detection system to work synchronously with legacy monitoring tools to provide a unified view of security and performance metrics;

utilizing a Generative AI module to enrich RPC transactions with additional metadata for enhanced anomaly detection and resolution, wherein the additional metadata includes transaction type, frequency, and last execution times, and leveraging quantum computing algorithms to process the additional metadata to predict and identify potential vulnerabilities based on complex pattern recognition;

automatically detecting and resolving issues within microservices through self-healing mechanisms to maintain uninterrupted system operations, including automatically rerouting traffic or requests to backup systems when anomalies are detected, and restoring normal operation without human intervention;

employing machine learning algorithms, including both supervised and unsupervised learning, to predict and detect both known and novel anomalous behavior patterns based on historical data comparisons and autonomous exploration of new data patterns, thereby allowing for proactive adjustments to system configurations and parameters in anticipation of similar future events;

adjusting security settings and RPC communication parameters in both the staging and production environments automatically based on feedback mechanisms from detected anomalies, including dynamic adjustments to encryption levels and access controls; and providing automatic notification mechanisms integrated within the existing monitoring and alerting frameworks to alert system administrators of detected anomalies, including detailed reports on nature, severity, and potential impact of the anomalies, with actionable recommendations for corrective actions tailored to specific system requirements and administrator preferences, and enabling manual override by the system administrators to take immediate, informed actions to address and resolve the detected anomalies in the production environment, ensuring continuous operational integrity and security maintenance.

2. A system for proactive real-time anomaly detection in cross-environment RPC communications between multiple computing environments, comprising:

processor;

a network monitoring module configured to continuously monitor RPC communications between a staging environment and a production environment, utilizing sensors and detectors to analyze data flow and command execution patterns;

a GraphRPC module employing advanced graph analysis techniques integrated with machine learning algorithms to process graph data structures representing RPC interactions for intelligent real-time fault detection and anomaly resolution;

a real-time graph matrix dynamically updated to visually represent interactions and dependencies within the RPC communications, configured to refresh on a sub-second basis to reflect real-time data;

an ingestion pipeline for aggregating and archiving RPC call data, connected to an aggregated graph model that compiles comprehensive historical views of service interactions and RPC data flows for in-depth analysis and identification of long-term patterns and optimization opportunities;

existing monitoring and alerting frameworks integration interface to streamline workflow management and enhance fault detection, configured to synchronize with legacy monitoring tools providing a unified security and performance metrics view;

a Generative AI module that enriches RPC transactions with additional metadata, utilizing quantum computing algorithms for processing said additional metadata to predict and identify potential vulnerabilities;

a self-healing mechanism within a microservices architecture, programmed to automatically detect and resolve issues, including rerouting traffic or requests to backup systems and restoring operations without human intervention;

machine learning algorithms including supervised and unsupervised learning techniques programmed to analyze historical and real-time data to predict and detect known and novel anomalous behavior patterns;

security and communication parameter adjustment tools configured to automatically modify settings in both the staging and production environments based on anomaly detection feedback; and an alerting subsystem integrated within the monitoring and alerting frameworks to provide automatic notifications to system administrators about detected anomalies, including detailed anomaly reports with actionable corrective recommendations and manual override capabilities for immediate resolution.

3. The system of claim 2, wherein the network monitoring module includes high-speed data processing units capable of handling high volumes of RPC data and executing complex pattern recognition algorithms to detect anomalies in real-time.

4. The system of claim 3, wherein the GraphRPC module includes a dedicated neural network specifically trained to analyze RPC transaction graphs for identifying discrepancies that could indicate security breaches or operational failures.

5. The system of claim 4, wherein the real-time graph matrix includes user interface elements capable of displaying the graph data in various formats, including heat maps and node-link diagrams, to enhance visibility of real-time changes and potential threats within a network.

6. The system of claim 5, wherein the ingestion pipeline is equipped with high-capacity storage solutions and is configured to perform data sanitization processes to ensure the integrity and confidentiality of stored RPC call data.

7. The system of claim 6, wherein the aggregated graph model utilizes predictive analytics software to forecast potential future anomalies based on historical trend analysis, thereby enabling preemptive action to mitigate risks.

8. The system of claim 7, wherein the Generative AI module leverages a library of pre-trained models based on previous anomaly detection scenarios to enhance accuracy and efficiency of metadata enrichment and vulnerability prediction processes.

9. The system of claim 8, wherein the self-healing mechanism includes an automated testing module that performs integrity checks and functionality tests post-issue resolution to ensure that the system returns to its optimal operational state.

10. The system of claim 9, wherein the alerting subsystem is configured to escalate notifications based on severity of detected anomalies and can initiate emergency protocols including system lockdowns and detailed forensic analysis to prevent data loss or further intrusion.

11. A method for proactive real-time anomaly detection in cross-environment RPC communications between multiple computing environments, comprising the steps of:

monitoring RPC communications in real-time between a staging environment and a production environment to detect any unauthorized or unintended data transfers;

employing a GraphRPC method that utilizes advanced graph analysis techniques for intelligent real-time fault detection to quickly identify and address anomalies before they escalate;

employing a GraphRPC method that utilizes advanced graph analysis techniques for intelligent real-time fault detection, which includes deploying machine learning algorithms to process and analyze graph data structures representing RPC interactions, enabling identification and resolution of anomalies before escalation, thereby reducing risk of data breaches or operational disruptions;

generating and dynamically updating real-time graph matrix to visually represent interactions and dependencies within the RPC communications, facilitating immediate monitoring and alerting; wherein the graph matrix is updated on a sub-second basis to reflect real-time data flows and interactions across the network, ensuring swift detection and response to potential issues;

aggregating RPC call data into an ingestion pipeline and storing said data for historical analysis;

analyzing the aggregated data using an aggregated graph model to identify patterns indicative of potential security threats or operational inefficiencies over time; enabling in-depth analysis of system performance trends over time, and facilitating the identification of patterns and optimization opportunities for long-term operational success;

integrating into existing monitoring and alerting frameworks to streamline workflow management and enhance fault detection; wherein the integration includes configuring an anomaly detection system to work synchronously with legacy monitoring tools to provide a unified view of security and performance metrics;

utilizing a Generative AI module to enrich RPC transactions with additional metadata for enhanced anomaly detection and resolution; wherein the additional metadata includes transaction type, frequency, and last execution times, and leveraging quantum computing algorithms to process the additional metadata to predict and identify potential vulnerabilities based on complex pattern recognition; "applying quantum computing to analyze the enriched transactions to identify and address potential vulnerabilities; and automatically detecting and resolving issues within microservices through self-healing mechanisms to maintain uninterrupted system operations including automatically rerouting traffic or requests to backup systems when anomalies are detected, and restoring normal operation without human intervention;

employing machine learning algorithms, including both supervised and unsupervised learning, to predict and detect both known and novel anomalous behavior patterns based on historical data comparisons and autonomous exploration of new data patterns, thereby allowing for proactive adjustments to system configurations and parameters in anticipation of similar future events;

adjusting security settings and RPC communication parameters in both the staging and production environments automatically based on feedback mechanisms from detected anomalies, including dynamic adjustments to encryption levels and access controls; and providing automatic notification mechanisms integrated within the existing monitoring and alerting frameworks to alert system administrators of detected anomalies, including detailed reports on nature, severity, and potential impact of the anomalies, with actionable recommendations for corrective actions tailored to specific system requirements and administrator preferences, and enabling manual override by the system administrators to take immediate, informed actions to address and resolve the detected anomalies in the production environment.

12. The method of claim 11, wherein the real-time dependency graphs are utilized for continuous assessment of system vulnerabilities, dynamically adjusted based on changes in the RPC communications and potential threat levels, providing a proactive approach to problem-solving within a network.

13. The method of claim 12, wherein the continuous assessment further includes the use of machine learning algorithms to predict and detect anomalous behavior patterns in the RPC communications based on a comparison with historical data, thereby allowing for the identification of both known and novel anomalies.

14. The method of claim 13, wherein the machine learning algorithms are configured for supervised learning to refine anomaly detection based on feedback mechanisms from detected anomaly outcomes, thereby continuously enhancing detection accuracy.

15. The method of claim 14, wherein feedback from detected anomalies is used to automatically adjust security settings and RPC communication parameters in both the staging and production environments to mitigate risks and prevent future anomalies.

16. The method of claim 15, further including unsupervised learning algorithms to explore new data patterns autonomously, enhancing system adaptability to evolving security threats by identifying unforeseen anomalous patterns that have not been previously categorized.

17. The method of claim 16, wherein new anomalous patterns include analyzing deviations from established operational patterns in the RPC communications, flagged as potential security breaches or operational disruptions, and automatically initiating preventive measures to safeguard data integrity.

18. The method of claim 17, further comprising automatic notification mechanisms integrated within the monitoring and alerting frameworks to alert system administrators of detected anomalies, providing detailed reports on the nature, severity, and potential impact of the anomalies.

19. The method of claim 18, wherein the notifications include detailed, actionable recommendations for corrective actions based on a type and severity of the detected anomalies, tailored to specific system requirements and administrator preferences.

20. The method of claim 19, wherein the recommendations for corrective actions include options for manual override by system administrators, enabling them to take immediate, informed actions to address and resolve the detected anomalies in the production environment, ensuring that the system maintains high standards of reliability and security.

* * * * *